United States Patent
Bach et al.

[15] 3,652,292
[45] Mar. 28, 1972

[54] INSTANT COFFEE PRODUCT AND A PROCESS FOR ITS MANUFACTURE

[72] Inventors: Heinz Bach; Max Bottger, both of Suchteln; Heinrich Pabst, Schulberg, all of Germany

[73] Assignee: General Foods Corporation, White Plains, N.Y.

[22] Filed: Mar. 7, 1968

[21] Appl. No.: 711,221

[30] Foreign Application Priority Data

Mar. 8, 1967 Austria ...............................A 2209/67
July 31, 1967 Austria ...............................A 7104/67
July 31, 1967 Austria ...............................A 7105/67
Nov. 16, 1967 Austria ...........................A 10331/67

[52] U.S. Cl. .....................................................99/71
[51] Int. Cl. ...................................................A23f 1/08
[58] Field of Search .........................................99/71, 65, 68

[56] References Cited

UNITED STATES PATENTS

| | | | |
|---|---|---|---|
| 2,557,294 | 6/1951 | Kellogg | 99/71 |
| 2,853,387 | 9/1958 | Wutting | 99/71 |
| 3,132,947 | 5/1964 | Mahlmann | 99/71 |
| 3,244,533 | 4/1966 | Clinton | 99/71 |
| 3,261,689 | 7/1966 | Ponzoni | 99/71 |
| 1,716,323 | 6/1929 | Rector | 99/65 |
| 3,227,558 | 1/1966 | Richmond | 99/71 |

FOREIGN PATENTS OR APPLICATIONS 2,332 5/1916 Great Britain ............................99/71

OTHER PUBLICATIONS

Coffee Processing Tech., Sivetz & Foote, Vol. 2, pg. 245
Sivetz, Coffee Processing Tech. pg. 157, Vol. 2, 1963.

*Primary Examiner*—Frank W. Lutter
*Assistant Examiner*—Robert Halper
*Attorney*—Burgess, Dinklage and Sprung

[57] ABSTRACT

Soluble coffee solids prepared by extraction are mixed in an aqueous medium with wet ground colloidal particles of roast or extracted roast coffee, the latter representing about 3 percent to 40 percent by weight of the total weight of the coffee product. The colloidal particles are stabilized against flocculation by regulation of the pH so as not to exceed a pH of 5.2 and said particles are encased in the dried soluble coffee solids to form an instant coffee product having a fresh-brewed coffee aroma flavor and turbidity. The resultant coffee product may be admixed with additional soluble coffee powder. Drying is performed by conventional methods.

27 Claims, No Drawings

INSTANT COFFEE PRODUCT AND A PROCESS FOR ITS MANUFACTURE

This invention relates to an "instant-coffee" product, and a process for its manufacture.

Numerous proposals have already been made for the manufacture of ready-to-infuse rapidly soluble coffee powders or granules which are known under the general descriptive term "instant coffee." While initially the extraction of soluble roast coffee constituents with subsequent drying of the resulting extracts by the spray drying process gained very extensive acceptance in practice, proposals have more recently been made for improving the qualities, especially for developing a fullness of aroma which is more similar to a fresh coffee infusion. For example, it has been proposed to dry roast coffee extracts under conditions which do not damage the aroma, for example by freeze drying. It has also been proposed to add the oils containing the aroma substances of roast coffee, especially coffee bean oil, to the dry product in order thereby to obtain a product of more satisfactory odor and flavor. The fact remains that there are still considerable differences between the odor and aroma of freshly brewed coffee on the one hand and of instant coffee infused with hot or cold water on the other. Numerous users reject instant coffee as inferior in flavor in comparison with freshly brewed coffee, and the majority of users regards an improvement in flavor of instant coffee, in the direction of freshly brewed coffee, to be desirable.

It has recently been proposed to obtain a coffee extract powder mixed with the aroma substances of coffee by obtaining a thick juice from ground roast coffee by a conventional extraction process, and emulsifying this with a solution of roast coffee aroma substances in oil, especially coffee bean oil. The main feature of this proposal is that additionally a small quantity, namely 2 to 3%, relative to the solid content of the thick juice, of a finely ground roast coffee bean powder is added to the thick juice before subsequent freeze drying. Examination of this proposal has shown that there are considerable difficulties in the way of the realization of such an approach to the improvement of the aroma of instant coffee. Quite apart from the fact that such a product is not a true coffee extract but a material which together with the extract powder contains non-extracted fresh roast coffee bean powder, difficulties arise in redissolving this material, i.e. in preparing the ready-to-drink coffee. The added insoluble substances precipitate in the form of flocculent precipitates on infusing the coffee, especially with hot water, and these produce such an unusual optical impression that such a product is regarded by the consumer as being undrinkable.

The present invention is an attempt to solve the problem of combining the advantages of coffee prepared by fresh infusion with the simple preparation of instantly soluble coffee extract. The desired product should be as similar as possible to freshly brewed coffee not only in odor and fullness of aroma but also in external appearance, and should not, say, leave a large quantity of coarse coffee grounds in the cup. By the present invention, there is provided constituents of roast coffee ground to solid particles of colloidal size and against undesired influences during storage, for example influences which destroy the aroma, by carefully conceived "passivation" on the one hand whilst on the other hand the colloidal solids component is stabilized in such a way that, on infusing the product to give the ready-to-drink coffee, colloidally stable solutions or suspensions of the individual solid particles are obtained which do not lead to agglomeration with the formation of flocculent precipitates. The present invention provides an instant coffee product which in its total nature is more similar to freshly infused coffee than hitherto known rapidly soluble coffee products. On the one hand the odor and fullness of aroma of fresh coffee is hereby preserved in a hitherto unknown way, while on the other hand the rapidly soluble coffee according to the invention shows a turbidity caused by insoluble coffee solid constituents of colloidal particle size which corresponds to the natural turbidity of coffee. By the procedure of the invention considerable quantities of the coffee solids constituents which are ground to colloidal size are worked into soluble coffee extract substances and can at the same time be stabilized therein in such a way that on infusion of the product no precipitation of the colloidal solid constituent need be feared. The aroma-reinforcing and aroma-preserving ability of the colloidal substances employed in accordance with the invention at the same time remains practically unchanged over the period of time which is usual in the use of instant coffee and even beyond this.

The present invention provides an instant coffee product comprising a dried soluble coffee extract and roast coffee constituents ground to a colloidal particle size having a pH of at most 5.2.

The present invention provides a ready-to-infuse rapidly soluble coffee product based on dried soluble coffee extract solids which contains a proportion of colloidally ground roast coffee constituents. The essential characteristic of the invention is at the same time to be regarded as the fact that this proportion of colloidal insoluble solids is colloidally stabilized against undesired flocculation on precipitation. This colloidal stabilization is, according to the invention, achieved in that at least the proportion of the solids which are of colloidal particle size is adjusted to a pH-value in a more strongly acid range than is obtained on simply suspending these constituents in water or coffee extract. The invention thus involves a deliberate pH-value regulation, at least of the proportion of solids which are of colloidal particle size. According to the invention at least this part is adjusted to a pH-value of at most about 5.2, for example, it is worked into the dry product whilst adjusting to this pH-value. The colloidal coffee powder constituent is preferably adjusted to a pH-value below 5.0, for example to a value in the range of 4.0 to 5.0. It is preferred not to exceed pH-values of 4.9 during the adjustment and conversion of the colloidal constituent into the dry product, with the range from 4.3 to 4.9 and especially the range from 4.5 to 4.8 having proved to be particularly suitable. As a result of this measure and others within the present invention a reliable stabilization of the colloidal constituent against undesired flocculation on infusion of the new coffee product, even with water which may be as hot as desired, is achieved. At the same time a hitherto unknown fullness of odor and aroma is introduced into the finished product, or rather, according to the invention, the natural odor and aroma substances of the roast coffee which is extracted are preserved in a hitherto unknown way and are stabilized even over longer periods of storage.

Even though the details of the new coffee product will be dealt with extensively later, it may here already be stated that it is of particular advantage to carry out the pH-value regulation with coffee extract substances, especially with soluble coffee extract substances of higher acidity. In this way it proves possible, according to the invention, to provide a coffee product which is exclusively made up of constituents which are intrinsic to coffee, and which also in this respect ideally can be dissolved to give a product which resembles freshly infused filter coffee. At the same time the invention provides so to embed the proportion of coffee solids constituents of colloidal particle size in the dried soluble coffee extract substances and to encase them therein that an additional protection of the colloidal components which provide and preserve the aroma is ensured.

In using the principle which has been described for the conjoint use of stabilized colloidal solids the invention especially comprises mixed products which are on the one hand characterized by a content of the dry coffee substances containing colloids which have been described and on the other hand by essentially colloid-free dried soluble coffee extract substances. The invention is thus of particular importance for the manufacture of mixtures of conventional instant coffee powders or granules mixed with the coffee products containing colloidal solids which have been described. This is because it has surprisingly been found that the aroma-preserving and aroma-creating ability of the colloids employed in accordance with the invention is so intense that the conjoint use of relatively limited quantities of the colloidal materials together with conventional soluble coffee products leads to an unexpected improvement in the aroma, odor and other properties of the total product. Thus the invention also provides a ready-to-infuse rapidly soluble coffee product based on dried coffee extract substances, which is characterized in that it is a mixture of (a) a conventional rapidly soluble powder or granular material of coffee extract substances, for example an instant coffee obtained by freeze drying or especially by spray drying, with (b) a dried coffee extract which contains colloidally ground roast coffee constituents which are stabilized against flocculation especially by regulation of the pH-value. At the same time the colloid containing stabilized mixture component (b) is especially a material which meets the stipulations of the invention which have been described above.

The content of coffee solids of colloidal particle size in the instant coffee of the invention is as a rule considerable. It is appropriately above 3% by weight, preferably above 5% by weight, relative to the total weight of the coffee product. It may reach amounts of up to 40% by weight of the coffee product. In ready-to-use consumer coffee amounts of about 25% by weight of insoluble colloidal substances are preferably not exceeded. This however means that in products which are conceived as mixture components (b) for dilution with conventional soluble coffee, for example spray-dried coffee (a), considerable higher contents of insoluble colloids may be present, for example within the range of 15 to 35% by weight. For economic reasons it will frequently be desirable to adjust the amount of colloidal insoluble coffee to at least 8 to 10% by weight, so that for the ready-to-use end product the content of insoluble solids of colloidal particle size within the range of about 10 to 25% by weight can be particularly appropriate.

Beyond what has already been stated, the value of the invention furthermore rests on the surprising discovery which relates to the above-mentioned mixed products, of conventional soluble types of coffee, for example spray-dried coffee, and the coffee product which according to the invention contains insoluble colloidal solids. Herein one is dealing with the following phenomenon, which was not to be foreseen:

The stabilization of the colloidal solid constituent in the sense of the invention requires a regulation of the pH-value of this colloidal constituent to values which lie in a more strongly acid range than is found with normal coffee infusion. This can on the one hand lead to an effect on the flavor which a number of consumers describe as being less desirable, and can on the other hand initiate a problem which as a rule does not exist with conventional rapidly soluble coffee and also not with coffee. This is the precipitation of, for example, milk albumen on addition of milk or cream to the coffee as a result of the pH-value of the infusion having been displaced into the acid range. It has now surprisingly been found that these disadvantages can be overcome by mixing the acid-stabilized colloid-containing component with colloid-free coffee extracts of the usual pH-value. The usual coffee constituents in an infusion buffer the total mixture in such a way that neither a precipitation of milk albumen nor any change in flavor is observed. If desired it is possible so to adjust the basicity of the colloid-free components of the mixture that certain effects are established in the mixed products as a result of this. The surprising feature of this is that despite the buffering action of the generally predominant colloid-free less acid coffee constituent the reliable stabilization of the colloid-containing constituent against undesired flocculation of insoluble colloids remains fully preserved. In this way it thus proves possible completely to deal with the disadvantages of the acid colloid stabilization, which are in any case slight and only manifest themselves in a few cases, and exclusively to utilize its advantages. In this embodiment of the invention it is accordingly preferred to mix the material containing acid-stabilized colloidal insoluble solids of the invention, with at least such a quantity of a less acid, preferably conventional, coffee extract dry product that milk albumen does not coagulate in the infusion. Herein it is a particular characteristic of the invention that in order to achieve the aim set in this context it suffices to mix the particular dry products. In the infusion of this mixed product the two components, with their particular advantages, then act on one another in such a way that the colloid-containing component improves the aroma and odor of the non-colloidal component, while on the other hand the non-colloidal component annuls possible side-effects resulting from the acid stabilization of the colloidal component. From this fact there may be recognized the possibility of providing, by the procedure of the invention, materials which contain insoluble coffee constituents of colloidal particle size, which are added as diluents to conventional dry products of soluble coffee extract substances, whereupon mixed products of high quality and high economic virtue are produced, which in the sum of their properties are far above the level which can up to the present time be achieved in the field of instant coffee.

In addition to the material mixtures which have been described and which have properties which could not be foreseen, the invention provides a process for the manufacture of such mixtures of materials, with a series of variations in the special manufacturing process here being possible. These manufacturing processes at the same time in turn again comprise a whole series of phenomena which were unforeseeable but form the basis of the invention, and which will be discussed in detail.

A subject of the invention is accordingly furthermore the manufacture of the preparations containing insoluble colloidal coffee constituents, especially in a dry form, with a particularly important embodiment of this aspect of the invention relating to a process for fixing and stabilizing the aroma substances intrinsic to coffee in roast coffee extract, especially within the framework of the preparation of ready-to-infuse rapidly soluble coffee extract dry products, which is characterized in that the extraction, especially aqueous extraction, of soluble roast coffee constituents is carried out with the addition of roast coffee constituents ground to colloidal particle size, and that an extract containing coffee constituents of colloidal particle size and soluble coffee constituents is separated off and worked up.

Two embodiments are here of particular importance within the framework of the invention. The material intended for conversion to the colloidal state is subjected to colloidal grinding and the ground material thereby produced is now either mixed with further roast coffee which has been pre-ground in the usual manner in order subsequently to extract this mixture, with one or more fractions comprising colloids and containing soluble extract substances being withdrawn. Or, preferably, in one of the embodiments of greatest importance for practical implementation, for the manufacture of the materials containing insoluble colloidal substances, the procedure is however that the extraction of a roast coffee prepared in the usual manner is not simply carried out with the pure extraction agent, i.e. especially with water, but with an aqueous extraction agent which contains a not insignificant quantity of colloidal coffee solids. Here it is surprisingly found that the fullness of flavor of the roast fresh coffee is in this way particularly effectively preserved during its processing to give soluble dry products. The explanation of this effect remains doubtful. The fact is that the conjoint use of colloidal coffee solids in the extraction agent in the extraction of the fresh roast coffee on the one hand leads to an unexpected development and preservation of the coffee flavor in the finished product and on the other hand provides even greater safety against undesired flocculation of the colloidal component on infusing the dry product with hot water.

The invention accordingly also provides a process for the manufacture of a ready-to-infuse practically soluble coffee concentrate with improved fullness of flavour by extracting ground roast coffee and drying the extract, wherein roast coffee solids are ground to colloidal particle size, preferably by wet grinding, fresh roast coffee is then extracted with an aqueous solution or suspension of these colloids, the extract thereby produced is adjusted to a pH-value of below about 5.0, and the latter extract is finally dried to give a dry product.

The roast coffee component which is to be extracted may be of the same or different origin as the colloidal coffee component. It is within the scope of the invention that any desired mixtures of varieties of coffee are used in order to produce desired flavor nuances or trends. In the embodiment here described for manufacturing the new coffee product it is preferable to employ, in the extraction, a colloid-containing liquid phase whose colloidal solids content is below 10% by weight relative to this liquid phase. The colloid component preferably amounts to up to about 5% by weight, and as a rule it is possible to work with colloid contents of 2 to 5% by weight. The term colloidal particle size here and within the description of the invention generally, especially designates the particle size range of up to about $10\mu$, with the average size of the individual particles being in the range of $3\mu$ to $10\mu$. It will be appreciated that these particles are the result of grinding an insoluble material to particles of a "colloidal size."

In a special embodiment of the invention this colloid-containing aqueous liquid phase for coffee extraction is obtained by the coffee component which is to be worked to a colloidal particle size not being directly subjected to colloidal grinding but first being subjected to a preliminary extraction. In this embodiment of the invention the roast coffee, which has first been crushed to a moderate particle size, for example ground to about 2 to 3 mm., is initially subjected to an extraction under mild conditions. Temperatures of below 100° C. are here especially suitable, and it is possible to work in extraction columns under normal pressure. It can at the same time be appropriate to choose the amount of liquid extract herein withdrawn to be about equal to the amount of coffee starting material employed in this process stage. This first extract can, in a subsequent process stage, again be added to the product. This will be discussed later.

The roast coffee which has thus been pre-extracted, and which can now of course be ground more easily and therefore with less damage to the aroma than can dry roast coffee, is passed to the colloidal grinding stage. This colloidal very fine grinding can best be carried out as wet grinding with the addition of water. The use of soft or softened water is preferred both here and also in the other process stages. The colloidal grinding can best be carried out if the amount of water is a multiple of the dry weight of roast coffee employed, and in a preferred embodiment of the invention a ratio of about 5 to 12:1, especially about 9:1, is used.

The colloidal grinding of the pre-extracted material is appropriately effected in several stages. The suspension can first be passed to a preliminary comminution, which is appropriately carried out in a gear colloid mill. Thereafter there follows a further fine comminution for which a carborundum disk mill is for example very suitable. Here, it has again proved to be appropriate to work in at least 2 passes. An average degree of fineness of 100 to 500 $\mu$ is initially achieved. This degree of fineness is however not yet sufficient to achieve a stable colloid, so that the desired average value for the size of the individual particles of less than 50 $\mu$ and preferably of 3 to 100$\mu$, is achieved by a further comminution; for example in a mill of the same system but with a narrower setting. The colloid-rich liquid phase obtained in this manner has a certain viscous character.

Since, in conventional grinding devices, only a part of the solids is always ground to the desired colloidal fineness, it is advisable to separate the colloidal component from the not yet colloidal component in a manner which is in itself known. Centrifuges or other decantation systems are suitable for this. The decantation residue can again be passed through the colloid mill in its finest setting, and at the same time it is appropriate again to add water, for example again in the ratio of 9:1 (water to dry weight of the solids).

Using conventional grinding devices it has been found that colloid-containing ground liquids can in this way be obtained whose colloid component is less than 10% by weight, for example in the range of 2 to 5% by weight. These liquids are outstandingly suitable for the subsequent extraction of fresh roast coffee.

The residue of larger particles produced during the colloid grinding can be employed in the usual manner for obtaining soluble coffee extracts. Thus it is advisable to extract it in autoclaves with stirrers. The material is as a rule less suitable for a conventional column extraction since the very fine grinding makes the penetration of the material by hot water and under high pressure difficult or impossible if the material is stacked high in a column, without stirring. On the other hand no difficulties arise in an autoclave with a stirred container. Here the same yields are achieved as in the usual column process. The extract hereby initially obtained can, in one embodiment of the invention, be employed to obtain the colloid-containing end product. This again will be discussed later. The residue which is appropriately exhaustively extracted in this last stage is discarded.

Fresh roast coffee is now extracted with the optionally combined colloid-containing ground liquid. Here again it is preferred, in a special embodiment of the invention, to carry out this extraction in several stages in such a way that a first extraction stage under mild conditions is employed. In particular, temperatures of 80° to 100° C. are herein not exceeded and at the same time roughly normal pressure is used. Under these conditions a first fraction is preferably withdrawn in such a way that the amount of liquid roughly corresponds to the weight of coffee employed. The solids content is then about 10 to 15% by weight. The solution is notably cloudy, i.e. the proportion of colloid is very high.

This first extraction stage is followed by a usual post-extraction at elevated temperatures and appropriately at elevated pressure. The number of these subsequent extraction stages, the temperature and pressure level, and the column circuit system is, in a manner which is in itself known, determined by the yields of dry substance, relative to the weight of coffee employed, which are to be achieved. The extraction stages which follow the first extraction carried out under mild conditions also still show colloidal turbidity, though to a reduced extent. The residue hereby obtained, which is preferably exhaustively extracted, may be discarded.

As a result of the process stages hitherto described various liquid phases are now present. These are from the stage of obtaining the colloid, the first extract, as well as the residue extract from the exhaustive extraction of the non-colloidally ground component. From the stage in which the fresh roast coffee is extracted with the colloid-containing liquid there are present the first extract from the extraction under mild process conditions and at least one extract from the subsequent exhaustive extraction of the starting material. According to the invention it is now further preferred to combine at least the colloid-containing extracts and to further process them together. In a particularly appropriate embodiment it is also possible to admix the extract phases which have arisen during the production of the colloid. In a typical embodiment of the invention the colloid component lies within the range of up to about 40% of the combined extract substances and is for example about 20 to 35%. Depending on the total solids content of the extracts it may now be desirable to concentrate the extracts or the extract mixture. The degree of concentration of the extract before drying at the same time essentially depends on the desired nature of the end product. If for example foamed granules and a specific gravity of the dried product corresponding to that of the usual spray-dried coffee are to be achieved, the drying stage should start with a coffee extract containing 28 to 36% solids. Against this, a preliminary concentration to 18 to 22% solids content suffices to obtain crystalline granules. This preliminary concentration is carried out in a manner which is in itself known, under conditions which do not harm the aroma; ice concentration is particularly suitable for this purpose.

Before drying the colloid-containing extract or extract mixture the pH value adjustment already described is carried out. Here the pH value is adjusted to a range of for example 4.3 to 5.0, preferably above 4.5. The range from 4.7 to 4.9 can be particularly preferred. It is preferred to employ constituents intrinsic to coffee for the regulation of the pH value. Here the invention employs the known fact that the acidity of a coffee extract can be varied by varying the extraction conditions. The more severely a coffee powder is extracted, the higher, as a rule, is the proportion of acid components in the extract.

Separately from the process subject matter hitherto described, a coffee extract is accordingly prepared in the process of the invention, in the usual manner, under comparatively severe conditions and giving correspondingly higher acidity. This extract is then used to adjust the pH value. At the same time the acidity of the coffee extract can here — and also at comparable points of the process variants which are still to be described — be further regulated by a treatment with ion exchange resins in order to set up the desired acidity values in the coffee extract.

The mixed product is then converted to a dry product in a conventional manner. The use of conditions which do not harm the aroma, for example freeze drying, is herein preferred. This furthermore not only applies to the process variant here described but generally to the working-up of the colloid-containing solutions or suspensions in the sense of the invention. An instantaneously soluble coffee powder is produced which is characterized by a considerable content of colloidally ground solids. Substantial quantities of conventional coffee extract powders or granules can then be upgraded by means of this product.

In a further special embodiment of the invention a variation in flavor can here — and naturally also in the e.g. of colloid-containing products manufactured in other ways in accordance with the invention — be achieved by an aroma concentrate obtained by steam stripping being added to the colloid-containing extracts, especially before drying. In this variation known by the name of "stripping" the following procedure is preferably followed:

20 to 50% of the roast coffee to be extracted — that is to say e.g. the coffee not intended for the manufacture of the colloid — are subjected to a steam distillation in the ground state. The steam enriched with aroma substances is subsequently condensed. The concentrate thus obtained is added to the extract before drying.

It will be obvious that in detail the measures for preserving and securing the aroma as far as possible, which are known from the state of the art, are employed in carrying out the process stages. Thus it is for example advisable to use softened water and to cool the resulting extracts as rapidly as possible.

A summary of the stages of the new process for the manufacture of a colloid-rich extract which have been described for this form of manufacture is given in the flow diagram 1. The product is in this case the colloid-containing material of stabilized pH value which is especially suitable for upgrading when diluted with conventional soluble coffee products, for example spray-dried coffee.

As has already been explained, it is however also possible, in obtaining the colloid-containing stabilized products, to proceed by first subjecting a coffee starting material to a colloidal grinding, then mixing the ground material with other roast coffee which has been pre-ground in the usual manner, and then extracting this mixture, especially with water. The colloid-containing extract fractions hereupon produced are preferably combined and worked up to give the colloid-containing dry product. In detail, the following process is carried out:

Colloidal grinding is conveniently carried out in two stages in such a way that the material is first pre-ground to particle sizes of 70 to 500μ, especially 100 to 200μ, by means of a dry grinding in a suitable mill. The coffee powder thus obtained is then subject to colloidal grinding. In order to avoid any harm to the aroma at this stage, it is preferable to carry out the second stage of the grinding in the presence of water with cooling. The coffee powder can be mixed with water in the ratio of 2:1 to 4:1 and then subjected to colloidal grinding. The preferred aim is a particle size of the predominant part of the ground material within the range of 3 to 5 μ. Instead of employing the suspension of the coffee powder from the first grinding stage in water it is of course also possible to employ a cooled coffee extract as the liquid phase.

The ground material thus obtained is then mixed with normal coarsely ground coffee and extracted in a manner which is in itself known. It is appropriate to use the conventional battery extraction for this. According to the invention it is preferred to employ, for this extraction, coffee mixtures which contain up to about 40% by weight of the roast coffee which has been ground to colloidal fineness. It is especially preferred to extract coffee mixtures which contain between 15 to 25% by weight of colloidal ground coffee.

According to a further characteristic of the invention the extraction is carried out in a manner which does not harm the aroma. According to the invention a stepwise process is herein followed in such a way that in a first extraction stage only moderate extraction conditions are employed. Preferably temperatures of about 125° C. are not exceeded in this first stage of the extraction. It is for example possible to carry out the first stage extraction at about 120° C.; however, even lower temperatures may be used. This first extract contains a high proportion of the desired colloidal substances and is, in the described special embodiment of the invention, separated from the solid phase. It is best to cool it immediately. The remaining solid phase still contains a considerable proportion of soluble coffee constituents which can subsequently be dissolved out in a second and conventional extraction stage. For this purpose, this partially extracted coffee powder can for example be added to a fresh starting material for obtaining a conventional extract and be conventionally extracted together with this material. It is however also possible — and a special embodiment of the invention is based thereon — to subject the pre-extraced coffee powder by itself to a post extraction and then appropriately to combine the extract thereby obtained with the extract first produced.

The pH value regulation is then effected on the combined liquids. The solids content of the combined solutions can be relatively low, especially because of the mild extraction conditions in the first stage. This could lead to difficulties in the subsequent drying of these liquid components, especially if the drying is to take place in the foamed state by freeze drying. According to a further characteristic of the invention it is accordingly possible now first to concentrate the combined liquid components from the two stages of the extraction of the colloid-containing material. A partial freeze drying, or the conventional freeze concentration, is especially suitable. It is convenient to work towards a dissolved solids content within the range of 30 to 50% by weight. Such solutions can subsequently be easily foamed and be passed to the freeze drying in this form.

The pH adjustment which now follows is preferably again effected with more acid intrinsic coffee constituents, it again being possible to adjust the acid content in the coffee extract, and hence to vary the acid value, in a manner which is in itself known by treatment with ion exchanges. A complete system for the process stages described for this embodiment is shown in flow diagram 2, which shows the manufacture of a mixed product of a conventional dried extract and the extract which has been mixed with colloidal substances in accordance with the invention.

It will be understood that the pH referred to herein as the pH of the product is based on the pH of the material from which the dry product was produced. It will be clear that the pH of a cup of coffee made from the product (even if not mixed with a conventionally prepared coffee extract) will not necessarily be that of the liquid extract containing colloidal solids from which the product was prepared.

In a modification of the process hitherto described for the manufacture of the new coffee product it is however not necessary that the insoluble solids component of colloidal particle size should be present during the extraction of soluble coffee extract constituents. In this embodiment it is, rather, possible first to extract roast coffee in the usual manner and then to add the insoluble roast coffee constituents, ground to a colloidal particle size, to the extract containing soluble coffee constituents. For this it is thus for example possible to extract roast coffee in a manner which is in itself known and separately therefrom to comminute another part of the same roast coffee or a roast coffee of different origin to a colloidal particle size. If this colloidal insoluble solid component is then introduced into the extract obtained beforehand, the colloid stabilization by regulation of the pH value carried out, and the resulting mixture thereafter dried, then one again has an upgraded product in the sense of the invention. At the same time it is of course also possible simply to manufacture an insoluble coffee constituent ground to a colloidal particle size and then to mix this with a coffee extract adjusted to the desired pH value in sufficient quantities that the colloidal solids content is adjusted to within the ranges mentioned. The drying of such a mixture also leads to the products improved in the sense of the invention, or mixture components for improving further proportions of conventional soluble coffee. It is obvious — and has already been mentioned — that the production of the colloidally ground constituent is appropriately effected under conditions which do not harm the aroma. This primarily includes the wet grinding of coffee which is in itself known. Particular importance can furthermore attach to the use of a slightly pre-extracted pre-crushed roast coffee, with the pre-extraction having led to a softening of the coffee particle which is to be broken up.

Amazingly and indeed completely surprisingly it is here not even necessary, in the sense of the process according to the invention, to employ insoluble colloidal coffee constituents which themselves still retain the bulk of the aroma substances intrinsic to coffee. The effect of aroma preservation and aroma development is thus indeed not exclusively attributable to the fact that the colloidally ground component introduces, as it were, unharmed aroma substances of the roast coffee into the product. Rather, the insoluble colloidal solids develop an unexplained protective action on the aromatic constituents of the coffee which goes far beyond this. This phenomenon has already been discussed in the context of the extraction by means of a colloid-containing extraction liquid. It is evidently an important function of the colloid-containing material — and indeed independently of whether it itself still possesses a considerable content of aromatic substances or not — that it exerts an aroma-preserving and aroma-developing action in the coffee extracts of soluble coffee constituents. Coffee aroma substances which are still entirely present in the fresh extract of soluble coffee constituents but are lost or destroyed in the further course of working-up these extracts or on storage of the dry products, are protected against loss or destruction, in a hitherto unrecognized manner, by incorporating insoluble solids of colloidal particle size.

If this fact is taken into account, a further embodiment of the process according to the invention becomes understandable, which consists of first subjecting a roast coffee which has been pre-ground in the usual manner to an aqueous extraction, subjecting the solid phase hereby produced to colloidal grinding and at the same time preferably carrying out this colloidal grinding in the presence of at least a part of the liquid extract phase, then appropriately separating off the non-colloidal residue from the ground product regulating the pH value of the colloid-containing liquid phase to the range mentioned, and then drying the mixture which has been colloid-stabilized in this way. The dry product can again be mixed with conventional coffee extract powder in the manner described. In detail, the combination of the following process stages are suitable for this purpose:

A fresh roast coffee of any desired origin is subjected to preferably dry grinding in a first process stage. It is preferred to grind the material at relatively fine particle sizes, for example to particles sizes in the range of 70 to 500$\mu$, especially 100 to 200 $\mu$. It is obvious that here conditions which do not harm the aroma, for example grinding at temperatures which are not too high, are to be recommended. This powder is then subjected to an aqueous extraction in order to obtain a product which can, in a second grinding stage, namely the colloidal grinding, be converted into the essential flavour-generating and flavor-preserving component of the new finished product. Here it is preferred, in accordance with the invention, to carry out this aqueous extraction of the very finely ground roast coffee in two stages in such a way that in a first stage, which is subsequently described as "pre-extraction," one works at temperatures of at most about 100° C. and at approximately normal pressure, whilst in a second stage, the "post-extraction," the extraction is carried out at temperatures above 100° C., preferably in the range of 110° to 130° C., and at suitably elevated pressures. The pre-extraction is preferably carried out at normal pressure with almost boiling water, especially in the temperature range of 90° to 95° C. In both extraction stages, only limited quantities of water are used for the extraction. In particular, weight ratios of water to coffee powder within the range of 2:1 to 4:1 are suitable, and it is preferred to work with about 3 parts by weight of water per 1 part by weight of the roast coffee powder. The weight ratios here mentioned in each case relate to the weight of the dry coffee and this is to be taken into account in the post-extraction stage.

In this embodiment of the invention it is furthermore preferred to effect a separation of the liquid extract phase and the moist coffee powder after the pre-extraction. The liquid extract phase is cooled and preserved for further processing later in the process. The moist coffee powder from the pre-extraction is then, in the post-extraction, subjected to a second treatment under the conditions mentioned. Here again a liquid extract phase and a solid phase consisting of moist coffee powder are produced. According to a preferred embodiment of the invention these two phases from the post-extraction are not however, separated but are passed together to the subsequent colloidal grinding.

The abovementioned weight ratios of water to coffee powder in the two stages of the extraction have been chosen for practical reasons. They can be changed, particularly in the direction of using larger quantities of water, but this does not bring any advantage since the water must again be evaporated at a later point. A preferred extraction temperature for the post-extraction is about 120° C. The colloidal grinding of the total product from the post-extraction is effected in a manner which is in itself known, again under conditions which do not harm the aroma, preferably at temperatures which are only slightly elevated, if at all. It has been found that, compared to grinding the dry roast coffee, grinding according to the invention of a completely moist material which has already been treated with water at elevated temperatures results in improvements, especially in protection of the aroma. It will be clear that grinding the solid constituents in the method of the invention takes place more easily than in the case of dry roast coffee. In this colloidal grinding it is appropriate to grind as large a proportion of the solid product from the post-extraction as possible to a colloidal particle size. This proportion is preferably above 50% of the solid material employed. In practice it has proved preferable to grind about 80% of the solid starting material to particle sizes of 2 to 5 $\mu$.

The ground product is accordingly a liquid phase which according to the preferred embodiment of the invention here described consists of the liquid extract from the post-extraction in which the colloidally ground component is suspended or colloidally dissolved. Alongside this, small quantities of remnants of the solid starting material, which have not yet been ground to a colloidal particle size, are as a rule present for this second grinding. The material is then appropriately separated from this solid residue, for example by decantation. The separated solid material, which has, under the process conditions described, for example been extracted to the extent of 20 to 30% by weight (relative to fresh coffee) still contains significant quantities of soluble coffee constituents and is therefore not discarded but added to the conventional coffee extraction which is provided for obtaining the other component product for the new mixed extract, as will be described below.

If a liquid extract phase has been separated off after the pre-extraction, then two liquid phases are now present after the colloidal grinding, namely the liquid extract phase from the pre-extraction and the liquid phase from the post-extraction which contains the colloidal component.

This is followed by the colloid stabilization by regulation of the pH value. For this it is preferred to combine the liquid extract from the pre-extraction with the colloid-containing liquid phase from the colloidal grinding and then to effect the pH adjustment on the combined liquid. Here again the content of soluble solids in the combined solutions is relatively low because of the mild extraction conditions, so that concentration, for example for subsequent foaming for freeze drying, may be advisable. It will be clear that when adjusting the pH with acid coffee extracts it will as a rule by appropriate to use those acid extracts which have as high a solids content as possible. According to the invention it is preferred to match the degree of acidity and solids content of the conventional coffee extract employed for the pH adjustment to the solids content and initial pH of the colloid-containing liquid so that on pH adjustment at least approximately an equal amount by weight of soluble coffee solids, for example a 1-fold to 2-fold quantity, of the solids content of the colloidal liquid is added.

In the way which has been described, the insoluble colloid component is embedded in a larger quantity of the soluble solid constituents. The aroma substances taken up by it and/or still contained therein thus receive additional protection. Adjustment of the acid content in the coffee extract, and hence a variation of the acid value to the solids content, can here again be effected in a manner which is in itself known by treating this part of the extract by ion exchange.

A complete summary of the various stages of this embodiment of the invention which have here been described is shown in flow diagram 3.

In a further embodiment of the invention it can be appropriate already to carry out the colloidal grinding of the roast coffee whilst maintaining the intended acid pH conditions. This is by no means essential to achieve the result according to the invention. The adjustment of the pH value can not only be effected with acid constituents intrinsic to coffee but also with other physiologically tolerable acids, for example edible acids, hydrochloric acid or phosphoric acid. It is particularly this adjustment with hydrochloric acid which can be carried out in variations which are perhaps not uninteresting in particular cases. Here the pH value can first be comparatively strongly lowered by adding an excess of the hydrochloric acid, for example to values of below about 4.0, and the desired pH value within the range quoted can then be established by partial neutralization. If this partial neutralization is carried out with sodium hydroxide solution then sodium chloride, i.e. simply common salt, is produced as the product. Ultimately this simply means that a pinch of common salt has been added to the coffee, as is done regularly by many housewives. The aroma of the finished product is thereby not only not harmed but even further accentuated. For a number of reasons, especially considerations relating to food laws, the use of those embodiments first described which are exclusively based on constituents intrinsic to coffee is generally preferred.

The invention finally provides a further development in the production of mixtures of colloid-containing coffee products (A) with substantially colloid-free, especially conventional, components composed of soluble coffee extract substances (B). This form of the invention may be especially preferred when component (B) is one made under conditions in which the coffee aroma substances are comparatively strongly damaged. A typical example of this is coffee made by conventional spray-drying methods. In the drying stage, which is generally carried out at raised temperatures, a considerable proportion of the aroma substances are, as is known, irretrievably lost in spite of extreme precautions being taken. In the modification of the invention described in the following an effective remedy in this connection is afforded.

In accordance with the invention, in the production of mixed products of a colloid-containing component (A) with a colloid-free component (B) a part of the aroma substances is separated from the starting material used for (B) and added to the component (A) during its preparation. The idea of this form of the invention is to remove beforehand from the starting material used for (B) at least that part of the aroma substances of the starting material used for component (B) that is relatively volatile and is lost in the conventional drying operation. A material having a low content of sensitive aroma substances is then worked up into component (B). This working up is carried out without any deleterious influence on the less volatile and more stable aroma substances of the coffee that still remain.

The separated portion of the aromatic substances is not lost, but is added to the colloid-containing component (A). In this way the invention utilizes the aroma preserving and stabilizing action of the colloid constituent frequently described above. Advantageously the aroma concentrate separated from (B) is added to the colloid-containing material during the production of (A) immediately before the aroma-preserving drying, especially therefore freeze drying. In addition to component (B) having a low content of aroma substances, which is then mixed with component (B) of low aroma content to form the end product.

It is important that in this form of the invention a still further increased effect can be obtained in the preservation of the fullness of the aroma. Thus, while utilizing the described capabilities and properties of the colloid-constituent the aroma substances of component (B) are also preserved, which would otherwise be lost in working up (B) to a dry product, especially in spray drying.

The dearomatization of the material used for producing (B) is advantageously carried out by stripping with steam the roast coffee used or by partial distillation, especially of the aroma-rich first extract from the process for making (B). In both cases there are obtained water-clear aroma concentrates, which in the production of component (A) are usually incorporated immediately before the freeze drying. It has been found useful within the scope of the invention to carry out the stripping with steam to obtain this aroma concentrate from the fresh roast coffee used with a quantity of vaporized water which corresponds to one or two times the weight of the coffee used. When the aroma concentrate is obtained from an extract fraction the simplest procedure is to evaporate a part of this extract. It is preferred to evaporate about 5 to 10 volume percent. of the extract liquid phase and to incorporate the aromatic concentrate so obtained in (A).

EXAMPLE 1

Production of the Colloid-containing Extracts 100 kg. of fresh roast coffee are ground to a particle size of 2 to 3 mm. and then subjected to an extraction in an extraction column at 90°temperature of 90° to 95° C., during which an aroma-rich pre-extract is withdrawn which is of the order of magnitude of the weight employed. This pre-extract is immediately cooled and stored for subsequent further processing. These 100 kg. of the pre-extract contain about 8 kg. of solids.

The pre-extracted roast coffee is emptied out of the extraction vessel and mixed with softened water, in the ratio of 9 parts of water to 1 part of solids, in a mixing vessel. The suspension is next subjected to a preliminary comminution in a gear colloid mill, and this is followed by grinding in a carborundum disk mill. The product is ground to an average particle size value of 3 to 10µ. In a first stage of this wet grinding a colloid-containing liquid ground product containing about 32.5 kg. of solids is produced. The residue from the grinding is mixed with water in the ratio of 9 to 1 and is again passed through the colloid mill. The aqueous ground phase now contains about 14 kg. of solids of colloidal particle size. The colloid-containing ground product from the first stage of the wet grinding has a solids content of about 3 to 5% and the product of the second grinding stage a solids content of about 3 to 4%.

The non-colloidal residue, which is separated off by means of a decanter and which amounts to about 45.5 kg. of solids is conventionally extracted in an autoclave provided with a stirrer, at elevated pressure. Hereupon a further 10 kg. of solids are dissolved out and the residue (35 kg. of solids) is discarded. The liquid extract obtained during this exhaustive extraction is cooled and stored for further use. The previously obtained colloid-containing extracts are combined.

Extraction Stage 210 kg. of conventionally pre-ground roast coffee are subjected to a mild extraction with the combined colloid-containing solutions in a first process stage. This extraction takes place in the range of 80° to 100° C. Here again a first fraction is withdrawn in such a way that the amount of liquid approximately corresponds to the weight of coffee employed. The solids content of this fraction is about 37.5 kg. (15%). The turbid colloid-containing solution is rapidly cooled and stored for further processing.

The residue of the coffee from the pre-extraction is subjected to a post-extraction at elevated temperatures and pressure in a manner which is in itself known and is 800 exhaustively extracted. A liquid extract containing 84.5 kg. of solids, together with 135 kg. of a solid residue, is thereby obtained. The exhaustively extracted residue is discarded. The liquid extract is cooled.

Isolation of the Dry Product

All the extracts obtained, i.e. the pre-extract from the stage in which the colloid is obtained, the residue extract from the same stage, as well as the two extract phases from the extraction of the roast coffee with the colloid-containing liquid, are combined. The solids content is increased to about 30% by a partial freeze drying. 470 kg. of the liquid, containing 140 kg. of solids, are now present. The pH value is adjusted to 4.7 to 4.8. Furthermore a coffee aroma concentrate obtained by steam stripping is added. The mixture thus obtained is subjected to freeze drying in the conventional manner. The yield of solids from the process is about 140 kg.

The colloid-containing component obtained in this manner is suitable for dilution with any desired conventional soluble coffee extract products. It can thus for example be mixed with conventional spray-dried coffee in dilution quantities of, for example, one to four parts of sprayed coffee per part of colloid coffee. Surprisingly, the effect of aroma development is herein the stronger, the weaker the original intensity of aroma of the conventional soluble coffee product.

EXAMPLE 2

225 kg. of roast coffee are divided into 3 portions of 25 kg., 75 kg. and 125 kg. The 125 kg. are extracted in the usual manner in accordance with the column system until the desired yield of, for example, 40 to 41% relative to roast coffee is obtained. The concentration of the extract is preferably adjusted to 30%, where appropriate by interpolating a freeze concentration or evaporation using a thin layer evaporator.

About 170 kg. of extract with a total solids content of about 50 kg. result. Of this extract, about 20 kg. are put to one side, whilst the remaining 150 kg. are adjusted to a pH value of about 5.2 by means of ion exchange. This latter portion is subsequently passed to freeze drying, with the interpolation of foaming, granulating or sieving if it is intended to offer the final product in a granular form. The remaining 20 kg. of this extract, containing about 6 kg. of solids, are kept at the low pH value which has resulted from the extraction, i.e. for example 4.3 to 4.7 and are first cooled, and then put aside to be subsequently combined with the colloidally ground coffee.

The initially mentioned charge of 25 kg. roast coffee is subjected to a very fine dry grinding in suitable equipment and subsequently mixed with water in the ratio of 1:3. The 100 kg. of coffee suspension thus obtained are passed to a wet grinding in a colloid mill, if appropriate in several stages, until an average size of the individual particles of 3.5µ results. This somewhat sludge-like coffee preparation is, together with the 75 kg. of conventionally ground roast coffee (which still remained from the division of the 225 kg.), subjected to an extraction at 100° to 120° C. Herein it is appropriate to use little water in order to keep the concentration of the extract as high as possible. 150 kg. of extract, with an average solids content of about 20%, can be withdrawn, being a total of more or less 31 kg. of solids, of which the predominant part is present in the solution in the colloidal state. In the second step this is further extracted, by the usual column process, to the total yield which is also otherwise usual or desired, for example to 40 to 41%. Hereupon about 200 kg. of liquid of total solids content about 19 kg. are obtained. This extract is combined with the colloid-rich other liquid extract. An amount of liquid of about 350 kg., with a total solids content of about 50 kg. results.

This extract is appropriately brought to a solids concentration of around 30% by ice concentration, and after introducing the abovementioned extract component from the extraction of 125 kg. of roast coffee has a natural pH value of 4.3 to 4.7, depending on the type and on the method of extraction. The concentrate is subjected to freeze drying in the usual manner, again with the use of foaming and granulating, if desired, if the product is to be marketed in this form.

One now thus has 2 end products, of which one, having a relatively low pH value, comprises 56 kg. and contains a high proportion of colloidal substances, whilst the other amounts to 44 kg. and has a pH value of about 5.2 to 5.3 (according to experience the pH value shifts slightly upwards during freeze drying). The two parts are mixed. On infusion the product lies within the pleasant flavor range as regards total acid, in which range added milk also does not coagulate, and is very aromatic and colloidally cloudy.

Instead of mixing the colloid-containing constituent with a freeze-dried colloid-free coffee extract, the colloid-containing material can also be diluted with other usual soluble varieties of coffee, especially spray-dried coffee. Good results are for example achieved on mixing with 1 to 3 parts of spray-dried coffee per part of the colloid-containing coffee.

EXAMPLE 3

225 kg. of fresh roast coffee are divided into 2 batches of 25 kg. and 200 kg. The 200 kg. batch is extracted in the usual manner, best of all by the column system, to a yield of about 40% relative to the weight of roast coffee, so that in total an extract of about 270 kg. with a solids content of 80 kg. results. In order to achieve an average solids content of 30%, a freeze concentration or a thin layer evaporator can if desired be interpolated. Of these 270 kg. of extract, 100 kg. are put aside and stored cooled until they are subsequently mixed with the colloid component. The remaining 170 kg. are adjusted to a pH value of about 5.2 by means of ion exchangers, and are freeze-dried in the usual manner to about 50 kg. solids content, optionally with the interpolation of foaming and granulation if the end product is to be sold in this form.

The 25 kg. of roast coffee which have initially been put aside from the total weight of 225 kg. employed are fed to a dry very fine grinding step in a suitable apparatus, and thereafter subjected to a pre-extraction with 3 kg. of water per 1 kg. of coffee employed, at moderate temperatures. Hereupon a pre-extract of, for example, 25 kg., with approx. 14 to 15% solids content, i.e. approx. 3.7 kg. total solids, is obtained. The pre-extracted very finely ground coffee is again mixed with 50 kg. of water and in this state passes to a colloid mill. In this mill it is so finely ground, if appropriate by double passage, that the average size of the individual particles is in the range of 3μ. The coarser constituents can be removed by decantation and are subjected to an ordinary post-extraction. The main constituent amounting to about 105 kg. and having an average solids content of 15%, thus together representing 16.3% solids, is combined with the initially withdrawn pre-extract and preferably concentrated by freeze concentration, for example to a solids content of 30% In total, 70 kg. of extract, with a solids content of 20 kg., are obtained.

On adding the 100 kg. of liquid extract, which had initially been put aside from the extraction of the 200 kg. of roast coffee, this liquid batch is adjusted to a pH value of about 4.7. It contains a large quantity of colloidal constituents. The extract is passed to a freeze drying, again optionally with preliminary foaming and granulation. 50 kg. of freeze-dried product are obtained. The pH value of this product is so low that the dried coffee extract thus obtained is considered to be too acid by average consumers, and there is also the danger of coagulation of milk. The product is therefore mixed with the conventionally extracted and freeze-dried coffee extract whose manufacture was described initially. The products are normally mixed in the ratio of 1:1. 100 kg. of freeze-dried coffee extract result from the 225 kg. of roast coffee which in total is extracted. The end product is distinguished by particular richness of aroma.

Instead of mixing the colloid-containing component with a freeze-dried colloid-free coffee extract, the colloid-containing material can also be diluted with other conventional soluble types of coffee, especially spray-dried coffee. Good results are for example achieved on mixing with 1 to 3 parts of spray-dried coffee per 1 part, in each case, of the colloid-containing coffee.

EXAMPLE 4

400 kg. of ground roast coffee are subjected to steam distillation. The stripped aroma concentrate is cooled and retained.

800 kg. of roast coffee ground in the usual way and the 400 kg. of product stripped as above are extracted in the usual way in a column system. The solids yield, based on the roast coffee, is 40 to 45% and the solids content of the extract was 20 to 23%. The product is spray-dried in the usual way.

80 kg. of roast coffee are pre-extracted under mild temperature conditions as described under Example 1 and then ground to colloidal size by several mills connected in series. After decanting, 40 to 50 kg. of roast coffee of colloidal size remain in aqueous solution 300 kg. of ground roast coffee were extracted with this solution in the manner described above in such a way that the first stage was carried out at a temperature of about 100° C., the second stage at about 120° C. while the third stage was carried out at a high temperature and pressure to obtain the desired yield. The first stages contain the colloidal material obtained by the extraction in preponderant quantities.

Both these stages are brought by freeze-concentration to a solids content in the extract of about 30%. The pH value lies, as stated in Example 1, at 4.7 to 4.9. The third stage was brought to a 30% solids content in the extract by a falling flow thin film evaporator.

The three stages were combined after concentration and the aroma concentrate which is derived from the stripping of the 400 kg. of roast coffee, which is finally extracted for spray drying, are added to the concentrated extract immediately before the freeze drying. About 170 kg. of final product is obtained and about 500 kg. of the product of spray-drying is mixed with this 170 kg. The total 650 to 700 kg. product contains about 40 kg. of colloidal material which gives to the infusion a colloidal turbidity and a pleasant aroma strength.

EXAMPLE 5

600 kg. of roast coffee were ground in the usual manner and conventionally extracted in a column system. The yield, based on the coffee, is 40 to 45% and the solids content in the extract 20 to 23%.

A further 600 kg. of roast coffee were extracted, after conventional grinding, with a three-fold quantity of water at the boiling point. 1,200 kg. of extract with a solids content of 7 to 8% were obtained. The extract was passed to a high-turbulence falling film evaporator. At a vacuum of 500 to 600 mm. Hg and a temperature about 65° C., 5 to 10% of the liquid is evaporated and condensed in a condenser at a lower temperature. This very aroma-rich condensate is retained.

In the post-extraction these 600 kg. are also extracted at the usual temperatures and pressures to a yield of 40 to 50% based on the coffee. Because of the prior removal of the first extract, this extract is thinner than is usual for spray drying. It is therefore concentrated in the same thin film evaporator at normal temperatures so that after being combined with the first drawings of the pre-extract it can be spray-dried at the usual 20 to 23% solids concentration.

The preparation of the colloidal-rich freeze-dried coffee proceeds as described in Example 3. The aroma concentrate obtained by steam distillation was replaced by the concentrated extract of the aroma condensate that is obtained in the thin film evaporator from the extraction stage extended by spray-dried material. This product also gives the resulting mixture a particular aroma-richness and colloidal turbidity.

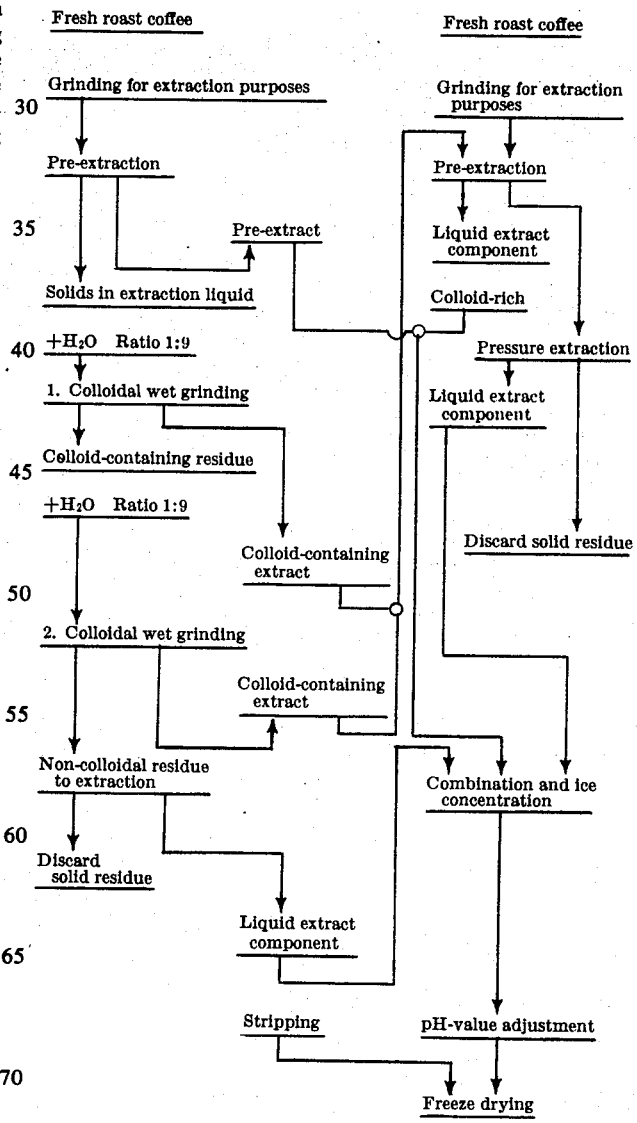

FLOW DIAGRAM 1

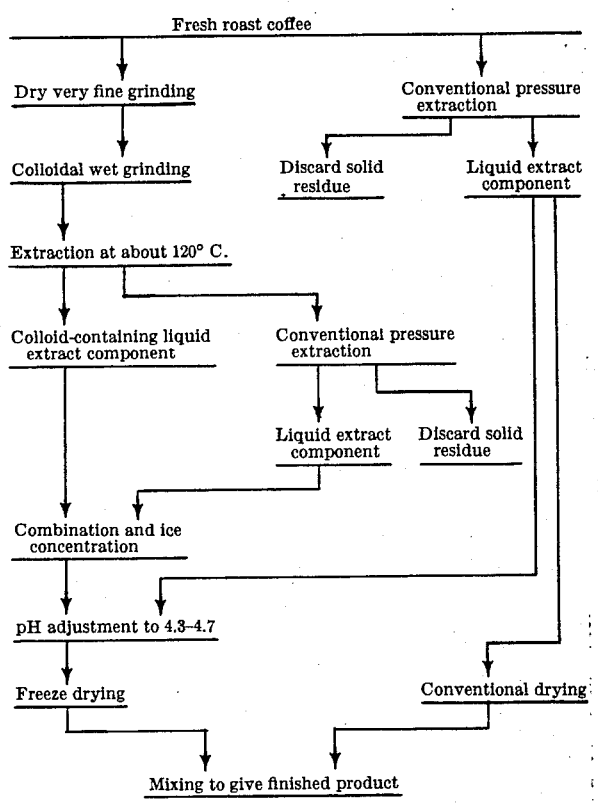

FLOW DIAGRAM 2

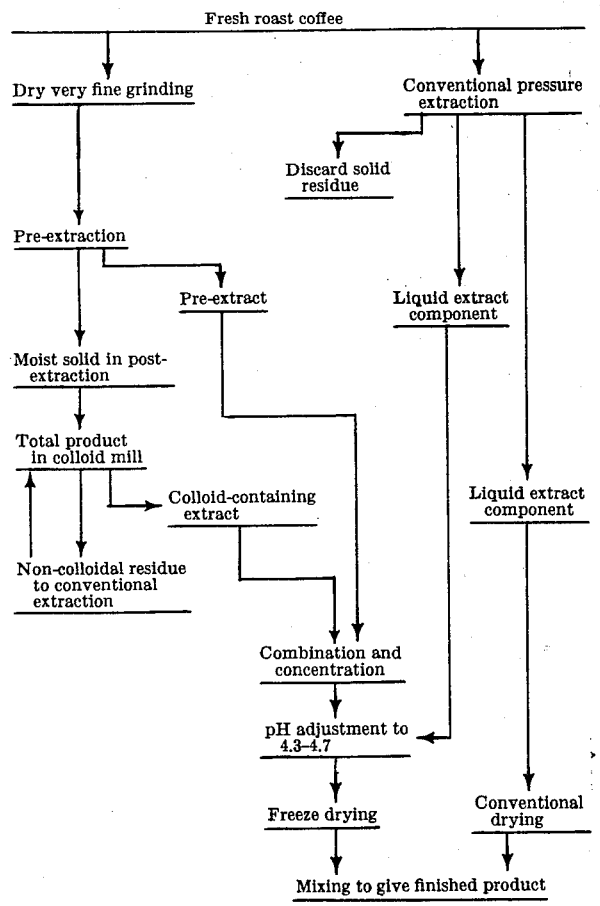

FLOW DIAGRAM 3

What is claimed is:

1. An instant coffee product having fresh-brewed coffee aroma, flavor and turbidity, comprising dried soluble coffee solids having incorporated and encased therein wet ground colloidal particles of roast or extracted roast coffee said colloidal particles having a particle size of about 3 to 10 microns and being effective to remain in suspension in dilute aqueous medium and to provide fresh-brewed aroma, flavor and turbidity, said dried soluble and wet ground colloidal particles having been dried from an aqueous medium having a pH adjusted so as not to exceed 5.2, said colloidal particles being present in from above 3% by weight up to 40% by weight relative to the total weight of the coffee product.

2. The product of claim 1 wherein the instant coffee is vacuum freeze dried.

3. The product of claim 1, wherein the pH is within the range of 4.3 to 4.9, and wherein the colloidal particles comprise, on a dry weight basis, from 15 to 35% by weight of the product.

4. The product of claim 1 which further includes an additional amount of dry powdered soluble coffee, the weight of wet ground particles being from 3% by weight up to 40% by weight relative to the total weight of the coffee product.

5. The product of claim 4 in which the dried soluble coffee solids are freeze dried and the additional soluble coffee is spray dried soluble powder, the weight of wet ground particles being from 3% by weight up to 40% by weight relative to the total weight of the coffee product.

6. A process for the manufacture of an instant coffee product having improved, regular coffee aroma, flavor and turbidity, and which forms a stable colloidal suspension when infused which comprises:
    wet grinding roast or extracted roast coffee to particles of colloidal size having a particle size of about 3 to 10 microns effective to remain in suspension in dilute aqueous medium and to provide fresh-brewed aroma, flavor and turbidity;
    incorporating and encasing said colloidal particles in soluble coffee to form an aqueous mixture of soluble coffee solids and colloidal particles having a pH which is adjusted so as not to exceed 5.2; and
    drying the mixture, said colloidal particles being present in from above 3% by weight up to 40% by weight relative to the total weight of the coffee product.

7. The process of claim 6 which further includes pre-extracting the roast coffee, recovering the extracted roast coffee, preparing an aqueous mixture of the extracted roast coffee, wet grinding the aqueous mixture and recovering an aqueous mixture of colloidal material having a particle size of about 3 to 10 microns.

8. The process of claim 7 which further includes separating a non-colloidal residue from said wet ground aqueous mixture and subjecting said residue to a post-extraction at elevated temperatures in order to exhaustively extract the residue, and recovering the coffee extract therefrom.

9. The process of claim 7 wherein the pre-extraction is carried out at a temperature not exceeding 120° C., and wherein the amount of water to amount of roast coffee on a dry basis employed during wet grinding is from 5:1 to 12:1.

10. The process of claim 7 which further includes subjecting ground roast coffee to a mild extraction employing the aqueous mixture of colloidal material and recovering a soluble coffee extract containing colloidal particles of roast coffee having a particle size of about 3 to 10 microns.

11. The process of claim 7 in which ground roasted coffee is subjected to a staged extraction by first extracting under mild conditions employing the aqueous mixture of colloidal material, withdrawing a first fraction of coffee extract from said ground roasted coffee, said extract containing roasted coffee colloidal particles of a particle size of about 3 to 10 microns and further subjecting said residue of ground roasted coffee to a post-extraction by conventional means in order to exhaustively extract the coffee and recovering the soluble coffee extract produced therefrom.

12. The process of claim 11 which further includes mixing said first fraction of coffee extract containing coffee colloidal particles with one or more of said soluble coffee extracts and drying the mixture.

13. The process of claim 12 in which the mixture is vacuum freeze dried.

14. The process of claim 12 in which an aroma fraction recovered from roasted coffee is added prior to drying said instant coffee.

15. The process of claim 7 in which at least two stages of wet grinding of roast coffee to colloidal size are employed and the colloidal roast coffee particles size recovered from the wet grinding stages is about 3 to 10 microns.

16. The process of claim 15 in which the amount of water to amount of roast coffee on a dry weight basis during wet grinding is from 5:1 to 12:1.

17. The process of claim 6 which further includes forming a mixture of wet ground colloidal coffee and coarsely ground roasted coffee, extracting the mixture by conventional means and recovering a coffee extract containing colloidal coffee particles having a particle size of about 3 to 10 microns.

18. The process of claim 17 in which the mixture of wet ground colloidal coffee and coarsely ground roast coffee is subjected to a first mild extraction, withdrawing a first fraction of coffee extract from the mixture, said extract containing colloidal material having a particle size of about 3 to 10 microns, subjecting the residue of the mild extraction to a post-extraction in order to exhaustively extract the coffee and recovering the coffee extract produced therefrom.

19. The process of claim 18 which further includes mixing the first fraction of coffee extract containing coffee colloidal particles having a particle size of about 3 to 10 microns with one or more soluble coffee extracts obtained from the process and drying the mixture.

20. The process of claim 19 in which the mixture is vacuum freeze dried.

21. A process for preparing an instant coffee product having fresh-brewed coffee aroma, flavor and turbidity comprising:
providing a minor and major portion of fresh roast coffee;
grinding the minor portion to a fine particle size;
extracting the ground minor portion with water and recovering an aroma rich pre-extract;
recovering the roast coffee residue from pre-extraction;
forming an aqueous mixture of water and recovered residue;
comminuting the aqueous residue and recovering an aqueous colloidal material;
separating the non-colloidal residue from colloidal grinding, exhaustively extracting said non-colloidal residue and recovering the liquid extract obtained from exhaustive extraction;
subjecting the major conventionally ground roast coffee portion to a mild extraction by aqueous colloidal material;
withdrawing a first fraction of extract containing colloidal roast coffee particles, said colloidal material having
an average size within the range of from 3 to 10 microns;
subjecting the said first extraction coffee residue to post-extraction to exhaustively extract the residue, and recovering a liquid extract;
combining at least one extract obtained during processing with the extract containing colloidal material so as to adjust the pH not to exceed 5.2 and drying the mixture, said mixture containing from above 3% by weight up to 40% by weight of colloidal particles of coffee relative to the total weight of the dry mixture.

22. The process of claim 21 wherein said mixture is freeze dried and is mixed with conventional dry soluble coffee in an amount such that the colloidal particles do not exceed about 25% by weight of the instant coffee product effective to enhance the regular coffee character thereof.

23. A process for preparing an instant coffee product having fresh-brewed coffee aroma, flavor and turbidity comprising:
providing first and second portions of roast coffee;
grinding the first portion to a finely ground state, mixing the finely ground roast coffee with water to form a suspension;
grinding the aqueous roast coffee suspension to produce a colloidal material;
mixing the colloidal material with the second portion of roasted and ground coffee;
subjecting the mixture to conventional extraction, withdrawing a first fraction of coffee extract containing roasted coffee colloidal material, said colloidal material having an average particle size within the range of from 3 to 10 microns, continuing extraction of the residue of the first and second portions of ground roast coffee by conventional means in order to exhaustively extract the coffee and recovering a soluble coffee extract therefrom;
combining the colloidal containing extract and conventionally obtained extract so as to adjust the pH not to exceed 5.2 and drying the mixture, said dry mixture containing from above 3% by weight up to 40% by weight of colloidal particles of coffee relative to the total weight of the dry mixture.

24. The process of claim 23 in which said mixture is freeze dried and is mixed with the dry soluble coffee in an amount such that the colloidal particles do not exceed about 25% by weight of the instant coffee product effective to enhance the regular coffee character thereof.

25. A process for preparing an instant coffee product having fresh-brewed coffee aroma, flavor and turbidity comprising:
providing a minor and major portion of roast coffee;
extracting the major portion in a conventional manner and recovering a soluble coffee extract;
subjecting the minor portion of ground roasted coffee to a first mild extraction and recovering a soluble coffee extract;
forming an aqueous dispersion of the residue of roasted and ground coffee from the first extraction and grinding to produce an aqueous colloidal material, said colloidal material having an average size within the range of from 3 to 10 microns;
combining the aqueous colloidal material with a portion of said coffee extracts to produce a mixture having the pH adjusted to not exceed 5.2, and vacuum freeze drying the mixture, said mixture containing from above 3% by weight up to 40% by weight of colloidal particles of coffee relative to the total weight of the dry mixture;
combining the remaining soluble coffee extracts and drying; and
finally combining the colloidal containing dry coffee mixture and said dried soluble coffee extracts in an amount such than the colloidal particles do not exceed about 25% by weight of the instant coffee product effective to enhance the regular coffee character thereof.

26. The process of claim 6 wherein the pH is adjusted by the addition of a physiologically tolerable acid.

27. The process of claim 6 wherein the pH is adjusted by the addition of acid extract substances intrinsic to coffee.

* * * * *